(12) United States Patent
Pedrotti

(10) Patent No.: US 10,454,263 B2
(45) Date of Patent: Oct. 22, 2019

(54) COMPRESSOR MOTOR OVERLOAD DETECTION

(71) Applicant: Carrier Corporation, Farmington, CT (US)

(72) Inventor: Kevin Pedrotti, Solvay, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 4 days.

(21) Appl. No.: 15/516,276

(22) PCT Filed: Sep. 22, 2015

(86) PCT No.: PCT/US2015/051391
§ 371 (c)(1),
(2) Date: Mar. 31, 2017

(87) PCT Pub. No.: WO2016/053679
PCT Pub. Date: Apr. 7, 2016

(65) Prior Publication Data
US 2017/0331271 A1  Nov. 16, 2017

Related U.S. Application Data

(60) Provisional application No. 62/058,185, filed on Oct. 1, 2014.

(51) Int. Cl.
*H02H 3/08* (2006.01)
*H02H 5/04* (2006.01)
(Continued)

(52) U.S. Cl.
CPC ............ *H02H 3/083* (2013.01); *H02H 3/085* (2013.01); *H02H 5/04* (2013.01); *H02H 7/085* (2013.01);
(Continued)

(58) Field of Classification Search
CPC .............................. H02H 3/083; H02K 11/25
(Continued)

(56) References Cited

U.S. PATENT DOCUMENTS 2,811,019 A * 10/1957 Courtney, Jr. .......... H02H 7/085
417/32
3,305,715 A * 2/1967 Stenger .................. H02H 7/085
318/473
(Continued)

FOREIGN PATENT DOCUMENTS

CN         101399435 A       4/2009
CN         102185276 A       9/2011
(Continued)

OTHER PUBLICATIONS

International Search Report issued in PCT/US2015/051391, dated Nov. 30, 2015; 6 pages.
(Continued)

*Primary Examiner* — Jorge L Carrasquillo
*Assistant Examiner* — Devon A Joseph
(74) *Attorney, Agent, or Firm* — Cantor Colburn LLP

(57) ABSTRACT

A system for detecting overloads of a motor comprises a motor configured to receive power via a lead line, a first sensing device configured to sense a temperature of a motor, and a second sensing device electrically coupled to the motor and configured to detect a target current of the motor and trigger a contact of the lead line associated with second sensing device when the target current equals or exceeds a trip value.

10 Claims, 4 Drawing Sheets

(51) Int. Cl.
  *H02H 7/085* (2006.01)
  *H02K 11/25* (2016.01)
  *H02K 11/27* (2016.01)
  *H02H 3/00* (2006.01)
  *H02H 7/00* (2006.01)

(52) U.S. Cl.
  CPC ............. *H02K 11/25* (2016.01); *H02K 11/27* (2016.01); *H02H 3/00* (2013.01); *H02H 7/00* (2013.01)

(58) Field of Classification Search
  USPC ........................................................ 318/783
  See application file for complete search history.

(56) References Cited

U.S. PATENT DOCUMENTS

| | | | | |
|---|---|---|---|---|
| 3,582,982 | A * | 6/1971 | Swinehart | H02H 3/06 361/75 |
| 4,084,406 | A * | 4/1978 | Brenneman | F04D 27/0284 318/779 |
| 4,291,355 | A * | 9/1981 | Dinger | H02H 3/04 318/800 |
| 4,796,142 | A * | 1/1989 | Libert | H02H 6/005 361/100 |
| 5,222,009 | A * | 6/1993 | Scharnick | H02H 7/0822 318/782 |
| 5,822,168 | A * | 10/1998 | Boudet | H01H 71/123 361/187 |
| 6,011,368 | A | 1/2000 | Kalpathi et al. | |
| 6,252,365 | B1 * | 6/2001 | Morris | H02H 7/0822 318/430 |
| 6,744,609 | B2 * | 6/2004 | Hiwatari | H02H 7/0851 361/24 |
| 7,042,180 | B2 | 5/2006 | Terry et al. | |
| 7,116,538 | B2 * | 10/2006 | Haensgen | H01H 71/0228 361/93.1 |
| 7,161,778 | B2 | 1/2007 | Zocholl | |
| 7,208,909 | B2 * | 4/2007 | Simon | H02H 7/0816 318/430 |
| 7,550,939 | B2 | 6/2009 | Davison | |
| 7,570,074 | B2 | 8/2009 | Gao et al. | |
| 8,255,200 | B2 | 8/2012 | Ingraham et al. | |
| 2006/0250154 | A1 | 11/2006 | Gao et al. | |
| 2012/0075754 | A1 * | 3/2012 | Jayanth | H02H 7/0852 361/26 |
| 2013/0070373 | A1 * | 3/2013 | Jefferies | H02H 3/006 361/31 |
| 2013/0187746 | A1 | 7/2013 | Augusta et al. | |
| 2013/0242439 | A1 * | 9/2013 | Perra | H02H 3/08 361/31 |
| 2014/0341252 | A1 * | 11/2014 | Kratzschmar | H02H 6/005 374/45 |
| 2014/0368956 | A1 * | 12/2014 | Perra | H02H 1/0092 361/30 |

FOREIGN PATENT DOCUMENTS

| | | |
|---|---|---|
| CN | 202616754 U | 12/2012 |
| CN | 202759403 U | 2/2013 |
| CN | 203289082 U | 11/2013 |
| CN | 03522429 U | 4/2014 |
| EP | 2355287 A1 | 8/2011 |
| GB | 2114390 | 8/1983 |
| WO | 2005046042 | 5/2005 |

OTHER PUBLICATIONS

Chinese Office Action Issued for Chinese Application No. 201580053438.9 dated May 24, 2018; 13 Pages.

* cited by examiner

COMPRESSOR MOTOR OVERLOAD DETECTION

CROSS REFERENCE TO RELATED APPLICATIONS

This application is a National Stage application of PCT/US2015/051391, filed Sep. 22, 2015, which claims the benefit of U.S. Provisional Application No. 62/058,185, filed Oct. 1, 2014, both of which are incorporated by reference in their entirety herein.

BACKGROUND

The disclosure relates generally to motor overload detection, and more specifically, to thermal and current based overload detection of a motor of an onboard compressor.

In general, a motor of a three phase hermetic compressor utilizes thermal protectors to detect thermal overloads. While thermal protectors act similar to a thermostat, these devices are not settable to allow various trip temperatures. Further, when using this type of overload protection, a motor is only protected at that fixed overload criteria (e.g., temperature). Thus, existing internal protection defines the limits of new applications of the motor.

SUMMARY

According to another aspect of the invention, a system for detecting overloads of a motor is provided. The system includes a motor configured to receive power via a lead line, a first sensing device configured to sense a temperature of a motor, and a second sensing device electrically coupled to the motor and configured to detect a target current of the motor and trigger a contact of the lead line associated with second sensing device when the target current equals or exceeds a trip value.

In addition to one or more of the features described above, or as an alternative, further embodiments may include the second sensing device being configurable to set the trip value to a rated load amp value and/or the second sensing device being a circuit sensing relay. Further, the first sensing device may be a module external to the motor and electrically coupled to at least one thermal sensor in a housing the motor and/or configured to detect a temperature of the motor and terminate power to the motor when the temperature equals or exceeds a target temperature. Furthermore, the system may comprise a three phase hermetic compressor that includes the motor, wherein the lead line is one of three lead lines providing three phase power to the motor.

According to another aspect of the invention, a method for detecting overloads of a motor is provided. The method includes electrically coupling a first sensing device and a second sensing device to a motor; providing power to the motor via a lead line; sensing, by the second sensing device, a target current of the motor; and triggering a contact of the lead line associated with second sensing device when the target current equals or exceeds a trip value.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As indicated above, because thermal protectors are not settable to allow various trip temperatures and only protect against a fixed overload criteria, thermal protectors are limited when the motors are implemented in different applications. Thus, what is needed is a system and/or method configured to provide thermal and current based overload detection of a motor.

In general, embodiments of the present invention disclosed herein may include a measuring system and/or method that incorporates a motor with a current sensing relay and a thermal overload solution. In this way, the thermal overload solution and the current sensing relay enable a threshold values to be set in advance to protect the motor against locked rotor situations, such as across the line locked rotor cycling, primary single phasing, and secondary single phasing.

Figure 1:
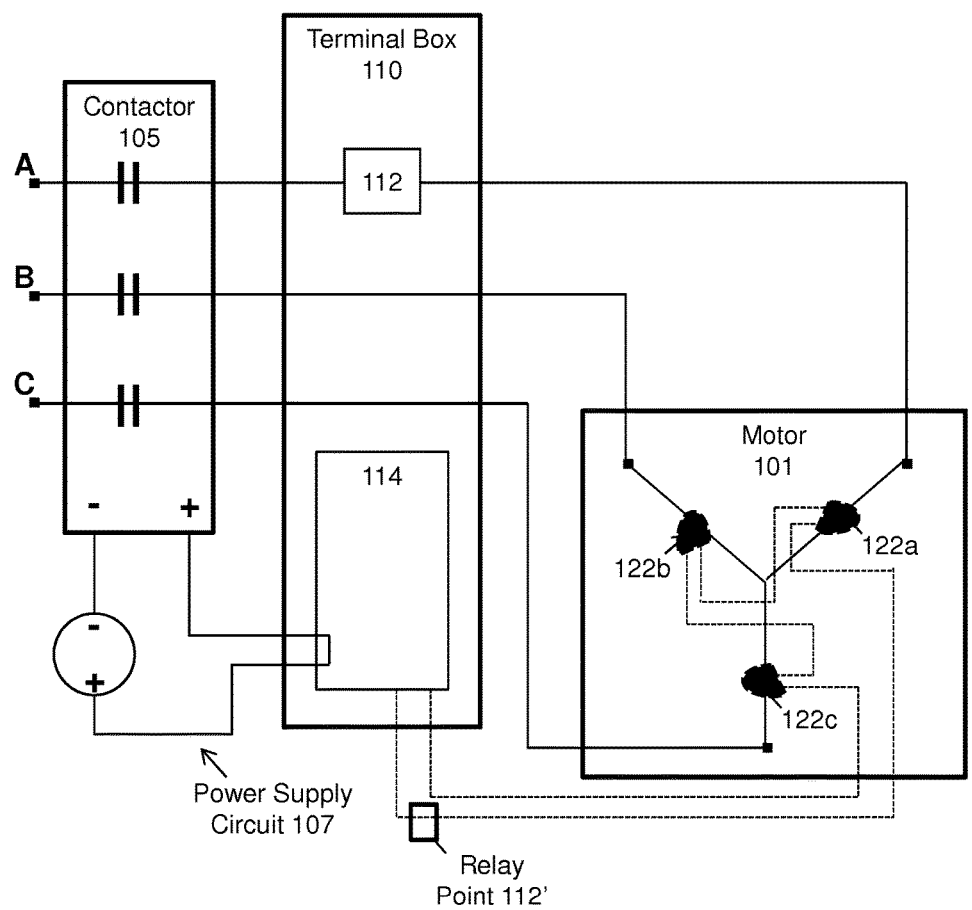
FIG. 1 illustrates a schematic of a measuring system.

In one embodiment, FIG. 1 illustrates a measuring system 100 that comprises a motor 101 (e.g., a compressor motor for a refrigeration system) that is fed three phase power by lead lines A, B, C via a contactor 105 (which is separately powered by a power supply circuit 107) and a terminal box 110. The terminal box 110 further includes a current sensing relay 112 and an external module 114 that control the contactor 105. The motor 101 in this embodiment includes at least one temperature sensor, such as temperature sensors 122a, 122b, 122c embedded in each phase. The measuring system 100 may include and/or employ any number and combination of sensors, computing devices, and networks utilizing various communication technologies that enable the measuring system to perform the measuring process, as further described with respect to FIG. 4.

The contactor 105 is an electrically controlled switch used for switching the lead lines A, B, C that connect and supply electricity to the motor 101. The contactor 105 is powered by the power supply circuit 107 and electrically controlled through the terminal box 110 by the current sensing relay 112 and the external module 114. The terminal box 110 is an electro-mechanical device for joining electrical circuits as an interface using a mechanical assembly. In operation, when the current sensing relay 112 and/or the external module 114 detect an overload condition for the motor, the contactor 105 will receive a signal from the current sensing relay 112 and/or the external module 114 that causes at least one of its contacts to trip, thereby terminating three phase power to the motor 101. Note that the current sensing relay 112 may be wired or coupled to any of the lead lines A, B, C, and is not limited to lead line A as shown in FIG. 1.

A sensor is a device that detects events or changes in quantities and provides a corresponding output, e.g., an electrical output signal. The current sensing relay 112 is type of sensor, and more particularly, is an electrically operated switch that controls the contactor 105 in accordance with a current detected a relay point 112'. In general, the current sensing relay 112 is either open or closed. For instance, once a trip value is set, the current sensing relay 112 will remain closed while the current is equal to or below the trip value and open while the current is equal to or above the trip value. In this way, when the current sensing relay 112 reads or detects a high current (e.g., a current above a trip value), the current sensing relay 112 triggers a contact of the contactor 105 corresponding to the lead line associated with the current sensing relay 112. As depicted in FIG. 1, the current sensing relay 112 will trigger the contact associated with lead line A.

The external module 114 (e.g., the thermal overload solution or first sensing device) is an electrically operated switch that controls the contactor 105 in accordance with at least one temperature sensor (e.g., temperature sensors 122a, 122b, 122c) embedded in the motor 101. The temperature sensors 122a, 122b, 122c are a type of sensor as described above, and more particularly, provide an electrical signal to the external module 114 corresponding to a detected temperatures of the motor 101. For instance, the external module 114 based on a temperature reading of the motor from any one of the temperature sensors 122a, 122b, 122c will remain closed while the temperature reading is equal to or below a temperature threshold and open while the temperature reading is equal to or above the temperature threshold.

Examples of temperature sensor 122a, 122b, 122c include fiber optic nano temperature sensor, heat meter, infrared thermometer, liquid crystal thermometer, resistance thermometer, thermostat, temperature strip, thermistor, thermocouple, and the like. In this embodiment, the temperature sensors 122a, 122b, 122c are operatively coupled to each phase of the motor 101. In any of the embodiments, the temperature sensors 122a, 122b, 122c may be located within a housing of the motor 101 to provide protection for the temperature sensors 122a, 122b, 122c from materials that may cause structural damage to the temperature sensors 122a, 122b, 122c.

The current sensing relay 112 enables the configuration of trip values, and the external module 114 enables the configuration of temperature thresholds. Thus, the measuring system 100 may be configured for different model motors (e.g., in different model compressors) utilized in different applications. For instance, in overload protection for present systems, each overload device must be particularly selected for the particular application, as the overload devices utilized in a first application may not work properly in a second application. In the measuring system 100, the current sensing relay 112 and the external module 114 are adaptable to current and temperature condition of any motor in any application.

For example, a three phase hermetic compressor may be employed in a number of variations, where each variation is configured for a particular rated load amp value application. In one variation, a seven horse power motor may be utilized by the three phase hermetic compressor and require overload protection. With present systems, a first overload device particular to a rated load amp value of the first application is applied directly to a first phase of the three phase hermetic compressor. In a subsequent variation, the same seven horse power motor and three phase hermetic compressor may also be require overload protection. However, the subsequent variation will have different or second rated load amp value. In turn, because the first overload device is particular to the first rated load amp values, the first overload device will not operate to properly detect the rated load amp values. In contrast, the measuring system 100 is adaptable to each variation because the trip value of the circuit sensing relay 112 is configurable to both the first and second rated load amp values. Thus, the measuring system 100, by setting threshold values in advance, thermal and current protection to the three phase hermetic compressor regardless of the variation.

In addition, as depicted in FIG. 1, the measuring system 100 employs three temperature sensors 122a, 122b, 122c located within the housing of the motor 101 on each phase. If any phase exhibits a temperature equal to or outside (whether high or low) a range of threshold temperatures, that particular phase is identified and a corresponding lead line A and contact is tripped. Because all three phases are protected by the three temperature sensors 122a, 122b, 122c, the measuring system 100 may include one current sensing relay 112. However, more than one current sensing relay 112 may be employed, such as when only one phase is protected as described in FIG. 2.

Figure 2:
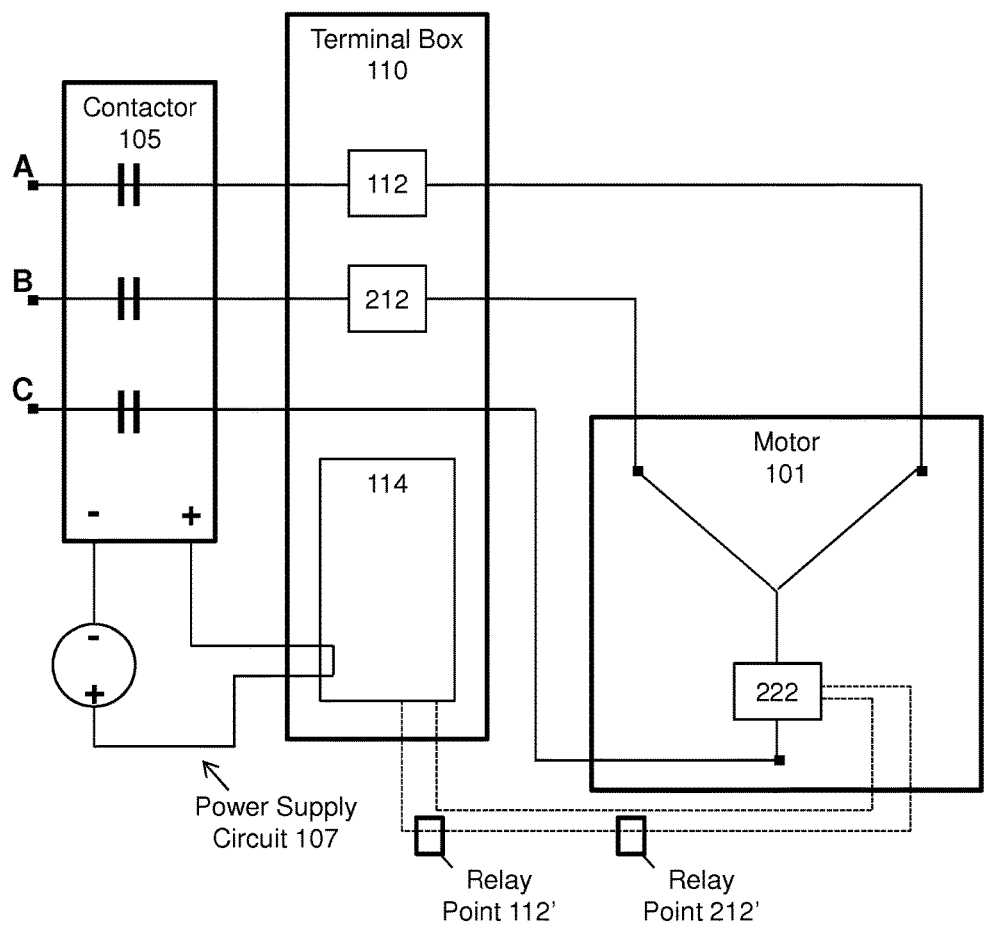
FIG. 2 illustrates a schematic of a measuring system.

In another embodiment, FIG. 2 illustrates a measuring system 200 that comprises the motor 101 that is fed three phase power by the lead lines A, B, C via the contactor 105 (which is separately powered by the power supply circuit 107) and the terminal box 110. The terminal box 110 further includes two current sensing relays 112, 212 and the external module 114 that control the contactor 105. The motor 101 in this embodiment includes at least one temperature sensor 222 embedded in at least one phase.

In FIG. 2, a single temperature sensor 222 is employed by the measuring system 200. Particularly, the temperature sensor 222 configured on the 'C' leg of the motor, which is connected to lead line C. In this way, the C phase is protected from temperature overloads when the temperature detected by the temperature sensor 222 breaches a threshold value. For example, the temperature sensor 222 may be configured to open at detected temperatures equal to or greater than 105° C. and close at detected temperatures equal to or less than 85° C. on the C phase of the motor 101. When the temperature detected by the temperature sensor 222 breaches 105° C., a contact corresponding to lead line C is tripped.

Further, since only the C phase is protected, the two current sensing relays 112, 212 are employed on lead lines A, B. Thus, the two current sensing relays 112, 212 control the contactor 105 in accordance with a current detected relay points 112', 212'. For instance, once a trip value is set, the two current sensing relays 112, 212 will remain closed while the current is equal to or below the trip value and open while the current is equal to or above the trip value.

Figure 3:
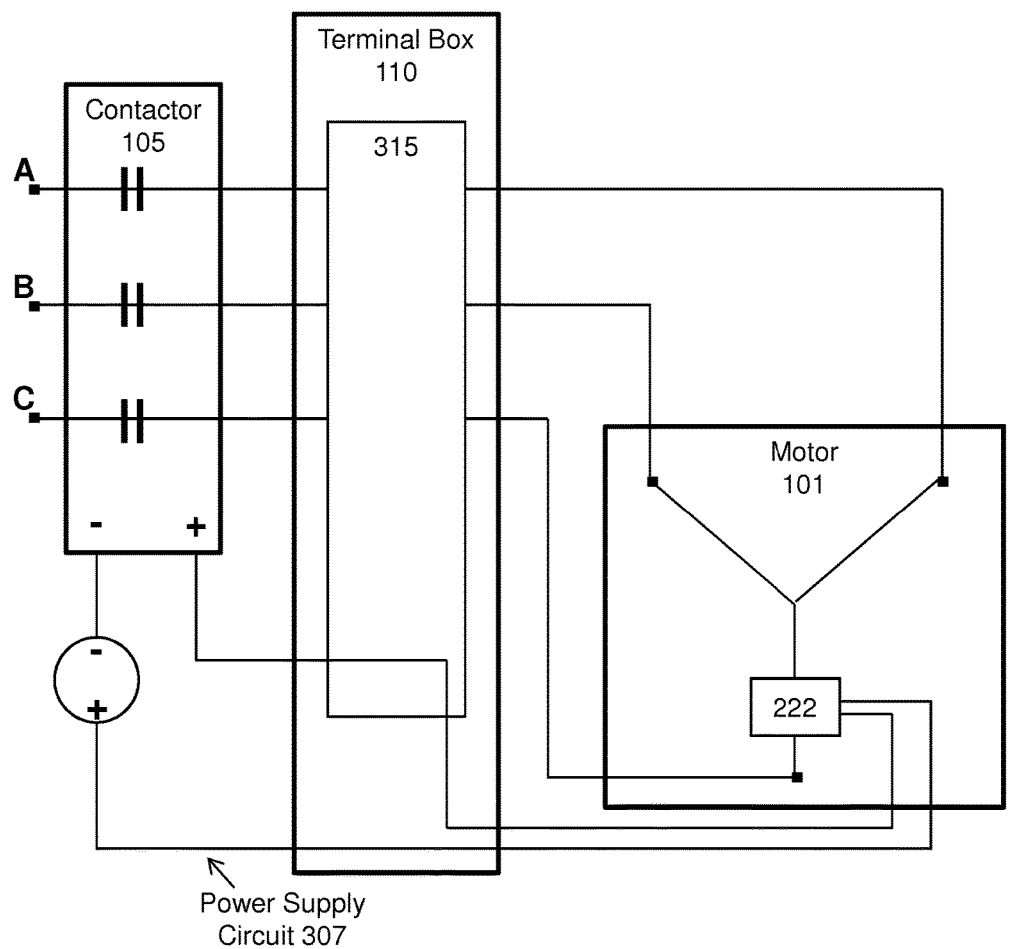
FIG. 3 illustrates a schematic of a measuring system.

In another embodiment, FIG. 3 illustrates a measuring system 300 that comprises the motor 101 motor that is fed three phase power by the lead lines A, B, C via the contactor 105 and the terminal box 110. The measuring system 300 further includes a power supply circuit 307, a three phase solid state overload relay 315, and the temperature sensor 222 embedded in the motor 101.

Similar to FIG. 2, the C phase is protected from temperature overloads when the temperature detected by the temperature sensor 222 breaches a threshold value. Yet, in addition to the temperature sensor 222, the three phase solid state overload relay 315 monitors the current from all three phases of the motor 101.

Figure 4:
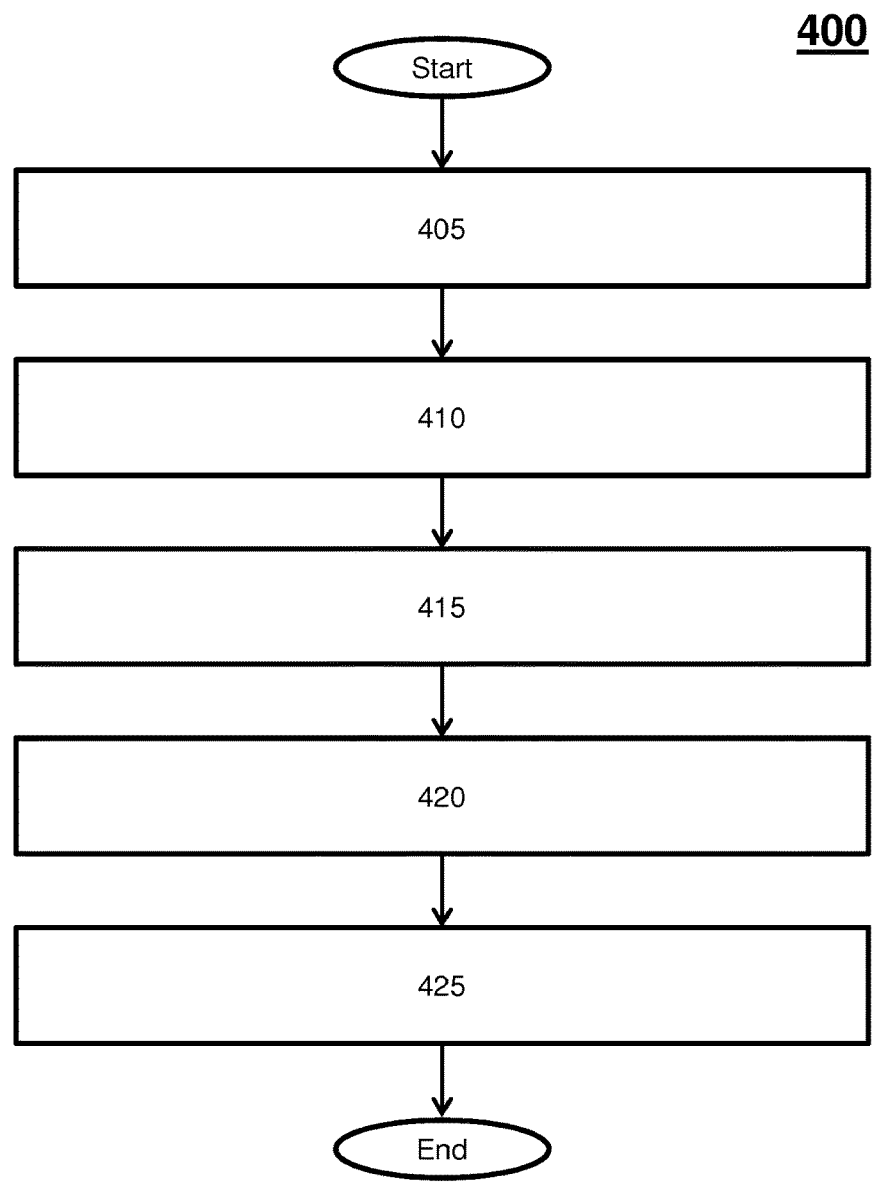
FIG. 4 illustrates a process flow of a measuring system.

FIG. 4 illustrates a process flow 400, which may be implemented by any of the measuring systems (e.g., 100-300) described above. The process flow 400 begins at block 405 when the measuring system electrically couples first sensing and second sensing devices to a motor detect. At block 410, the measuring system provides power to the motor via a lead line. For example, the measuring system provides three phase power to a motor of a three phase hermetic compressor, via three lead lines.

Next, at block 415, the second sensing device senses a target current of the motor and makes a comparison to a trip value that is preconfigured in the second sensing device. The second sensing device may be a circuit sensing relay 112, 212 or three phase solid state overload relay 315.

Then, the process flow 400 proceeds to block 420 where the measuring system triggers a contact of the lead line associated with second sensing device when the target current equals or exceeds a trip value. Then, the process flow 400 proceeds to block 425 where the measuring system outputs notifications based on the overload condition. The notifications, in general, are identifying information (or non-existence of the information) targeted to the systems or users responsible, such as a mechanic. Examples of notifications may include, but are not limited to, any combination of audio alerts (e.g., buzzers, bells, tones, telephone calls, cellphone calls, VoIP calls, voicemails, loudspeaker announcements, etc.), visual displays (e.g., flashing lights, display pop-ups), pager (e.g., SNPP), electronic mail (e.g., POP, IMAP, SMTP), desktop alerts (e.g., dialog, balloon, modal window, toast, etc.), instant messaging (e.g., IRC, ICQ, AIM, Yahoo! Messenger, MSN, XMPP, iMessage), text messaging (e.g., SMS), and the like. Then, the process flow 400 ends.

Technical effects of exemplary embodiments include providing thermal and current based overload detection of a motor. In this way, the thermal overload solution and the current sensing relay enable a threshold values to be set in advance to protect the motor against locked rotor situations, such as across the line locked rotor cycling, primary single phasing, and secondary single phasing.

Aspects of the present invention are described herein with reference to flowchart illustrations and/or block diagrams of methods and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the figures illustrate the architecture, operability, and operation of possible implementations of systems and methods according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for detecting overloads of a motor, the system comprising:
    a contactor comprising a plurality of contacts including a first contact, a second contact, and a third contact, the contactor feeding three phase power to the motor via a plurality of lead lines including a first lead line, a second lead line, and a third lead line, each of the plurality of contacts respectively corresponding to one of the plurality of lead lines;
    the motor configured to receive power via the plurality of lead lines;
    a terminal box configured to control the contactor, the terminal box comprising a first circuit sensing relay, and a second circuit sensing relay, the first circuit sensing relay being electrically coupled to the first lead line and a first current detected relay point, the first lead line being a lead line for a first phase of the motor, the second circuit sensing relay being electrically coupled to the second lead line and a second current detected relay point, the second lead line being a lead line for a second phase of the motor,
    a sensing device configured to sense a temperature of the motor, the sensing device being embedded in a third phase of the motor,
    wherein the first circuit sensing relay is configured to detect a target current of the motor via the first current detected relay point and trigger the first contact within the contactor associated with the first circuit sensing relay when the target current equals or exceeds a trip value,
    wherein the first current sensing relay and the second current sensing relays are wired to the terminal box to protect the third phase of the motor and remain closed while the target current is below the trip value and open while the target current is equal to or exceeds the trip value.

2. The system of claim 1, wherein the first circuit sensing relay is configurable to set the trip value to a rated load amp value.

3. The system of claim 1, wherein the terminal box comprises an external module external to the motor and electrically coupled to the sensing device.

4. The system of claim 1, wherein the sensing device is configured to detect the temperature of the motor and terminate power to the motor when the temperature equals or exceeds a target temperature.

5. The system of claim 1, further comprising:
a three phase hermetic compressor that includes the motor,
wherein the lead line is one of three lead lines providing three phase power to the motor.

6. A method for detecting overloads of a motor, the method comprising:
electrically coupling a first circuit sensing relay and a second circuit sensing relay of a terminal box to the motor;
providing, through a contactor, three phase power to the motor via a plurality of lead lines including a first lead line, a second lead line, and a third lead line, the contactor comprising a plurality of contacts including a first contact, a second contact, and a third contact, each of the plurality of contacts respectively corresponding to one of the plurality of lead lines, the first circuit sensing relay being electrically coupled to the first lead line and a first current detected relay point, the first lead line being a lead line for a first phase of the motor, the second circuit sensing relay being electrically coupled to the second lead line and a second current detected relay point, the second lead line being a lead line for a second phase of the motor;
sensing, by a sensing device via the current detected relay point, a temperature of the motor, the sensing device being embedded in a third phase of the motor;
sensing, by the first circuit sensing relay via the first current detected relay point, a target current of the motor; and
triggering the first contact of the first lead line within the contactor associated with the first circuit sensing relay when the target current equals or exceeds a trip value,
wherein the first current sensing relay and the second current sensing relays are wired to the terminal box to protect the third phase of the motor and remain closed while the target current is below the trip value and open while the target current is equal to or exceeds the trip value.

7. The method of claim 6, further comprising:
setting the trip value to a rated load amp value within the first circuit sensing relay.

8. The method of claim 6, further comprising:
electrically coupling an external module in the terminal box to the sensing device.

9. The method of claim 6, further comprising:
detecting, by the sensing device, a temperature of the motor; and
terminating a power to the motor when the temperature equals or exceeds a target temperature.

10. The method of claim 6, further comprising:
providing, as the power, three phase power to the motor,
wherein the motor is included in a three phase hermetic compressor, and
wherein the lead line is one of three lead lines.

* * * * *